K. FUKUDA.
NON-PNEUMATIC RUBBER BALL AND PROCESS OF MANUFACTURING THE SAME.
APPLICATION FILED FEB. 18, 1919.
1,320,221. Patented Oct. 28, 1919.
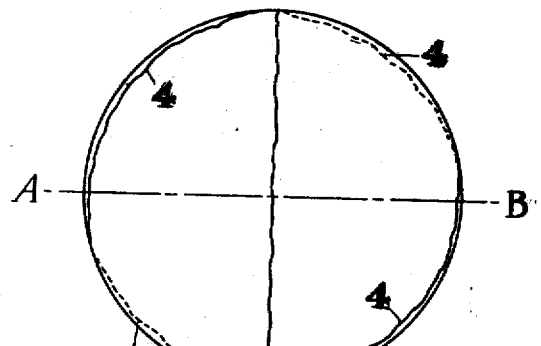
Fig. I
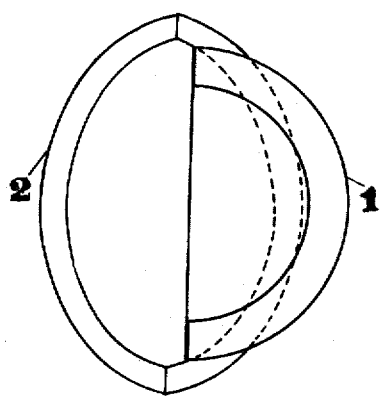
Fig. III
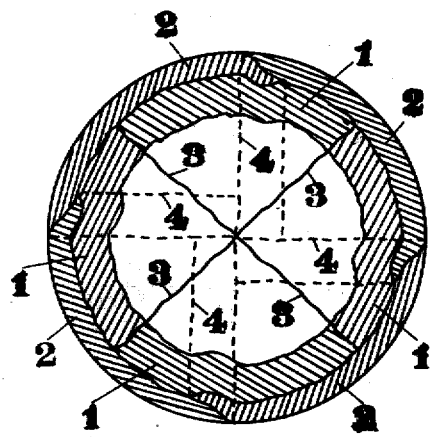
Fig. II
Inventor.
Kinsuke Fukuda
by Connolly Bros.
Attorneys

UNITED STATES PATENT OFFICE.

KINSUKE FUKUDA, OF TOKYO, JAPAN.

NON-PNEUMATIC RUBBER BALL AND PROCESS OF MANUFACTURING THE SAME.

1,320,221.     Specification of Letters Patent.     Patented Oct. 28, 1919.

Application filed February 18, 1919. Serial No. 277,706.

*To all whom it may concern:*

Be it known that I, KINSUKE FUKUDA, subject of the Emperor of Japan, residing at No. 3394 Oimachi, Iharagun, Tokyo, Japan, have invented certain new and useful Improvements in Non-Pneumatic Rubber Balls and Processes of Manufacturing the Same, of which the following is a specification, reference being had therein to the accompanying drawing.

This invention relates to process of manufacture of non-pneumatic rubber ball, which consists of double layers, the outer layer being a ball made of the ordinary rubber and the inner layer being a ball made of the spongy rubber.

To carry this process in practice, the inner ball is first made of four quadrantal segments made of the raw material of the spongy rubber. The inner ball is next covered by four quadrantal segments made of the raw material of the ordinary rubber, in such a way that the seams do not coincide each other. The double ball thus made is lastly heated suitably in a mold.

The accompanying drawings show a rubber ball made by this process, in which;

Figure 1 is a vertical view of a ball.

Fig. 2 is a sectional plan view along the line A—B in Fig. 1.

Fig. 3 is a vertical view showing the relative position of the segments of the inner and outer balls.

In the drawings, 1 designates a quadrantal segment of the inner ball. The inner ball is completed by four pieces of such quadrantal segments 1, which is made of the raw material to be converted into the spongy rubber by heating.

The inner ball thus made, is covered or coated by four pieces of the quadrantal segments 2 of the outer ball which is made of the raw material of the ordinary rubber. Herein a care must be taken to not coincide the seams 3 of the inner ball with the seams 4 of the outer ball.

The double ball made of the above mentioned two layers consisting of the raw materials, is heated suitably in a mold. Then the raw materials are converted into the ordinary rubber and spongy rubber, thus the finished ball consists of double layers of the ordinary rubber and the spongy rubber.

The ball manufactured by this process has a high elasticity, and retains its spherical form without any pneumaticity. Also there is no fear to lose its elasticity by a penetration.

The process is so simple and as the seams of the outer and inner balls do not coincide with each other, the ball may be used although some seams are opened.

Claims:

1. Process of manufacture of non-pneumatic rubber ball, characterized by making firstly an inner ball of four quadrantal segments made of the raw material of the spongy rubber, secondly in covering the inner ball by four quadrantal segments of the outer ball made of the raw material of the ordinary rubber, not coinciding the seams with each other and thirdly by heating suitably the double ball thus made in a mold, so as to convert the outer ball into the ordinary rubber and the inner ball into the spongy rubber, substantially as set forth.

2. As a new article of manufacture, a rubber ball composed of two spherical shells each composed of a plurality of segments, the seams of the inner shell being non-coincident with the seams of the outer shell, the inner shell being of spongy rubber and the outer shell being of compact rubber.

3. As a new article of manufacture, a rubber ball composed of two shells or layers, one inclosing the other and each composed of several quadrantal segments, the seams of the inner shell being non-coincident with the seams of the outer shell, said inner shell being of spongy rubber and said outer shell of compact rubber.

In testimony whereof I affix my signature in presence of two witnesses.

KINSUKE FUKUDA.

Witnesses:
T. KUSABA,
O. MATSUZAWA.